US005813603A

United States Patent [19]
Kurtz

[11] Patent Number: 5,813,603
[45] Date of Patent: Sep. 29, 1998

[54] LOW THROUGHPUT WATER SYSTEM FLOW CONTROL MEMBERS AND METHODS OF INHIBITING SWELLING OF SUCH MEMBERS

[75] Inventor: Thomas E. Kurtz, Xenia, Ohio

[73] Assignee: Vernay Laboratories, Inc., Yellow Springs, Ohio

[21] Appl. No.: 782,686

[22] Filed: Jan. 15, 1997

Related U.S. Application Data

[60] Provisional application No. 60/011,817 Feb. 16, 1996.
[51] Int. Cl.$^6$ ................................................ A01G 25/16
[52] U.S. Cl. .......................................... 239/1; 239/542
[58] Field of Search ............................ 239/542, 107–109

[56] References Cited

U.S. PATENT DOCUMENTS

| | | | |
|---|---|---|---|
| 2,897,164 | 7/1959 | Ford et al. | 260/5 |
| 3,028,346 | 4/1962 | Lemiszka et al. | 260/5 |
| 3,968,065 | 7/1976 | Morris et al. | 260/23.5 |
| 4,048,261 | 9/1977 | Starmer | 260/888 |
| 4,190,206 | 2/1980 | Atkinson et al. | 239/271 |
| 4,210,287 | 7/1980 | Mehoudar | 239/542 |
| 4,722,481 | 2/1988 | Lemkin | 239/542 |
| 4,869,432 | 9/1989 | Christy | 239/542 |
| 5,187,232 | 2/1993 | Musch et al. | 525/215 |
| 5,295,506 | 3/1994 | Smith | 239/542 X |

FOREIGN PATENT DOCUMENTS

| | | | |
|---|---|---|---|
| 623673A2 | 11/1994 | European Pat. Off. | |
| 650666A1 | 5/1995 | European Pat. Off. | 25/16 |
| 83 00004 | 1/1983 | WIPO | 239/542 |

OTHER PUBLICATIONS

Zetpol® Elastomers, Material Safety Data Sheet, MSDS No. Z00491, Issued Oct. 28, 1991, Zetpol® Hydrogenated Nitrile (HNBR) Elastomers.

Exxon Chemical, Material Safety Data Sheet, MSDS No. 00003501, Prepared Aug. 10, 1993, Cholorbutyl Rubber.

Natrochem, Inc., Material Safety Data Sheet, Revised Mar. 16, 1994, Trilene 65 DLC®–A.

Columbian Chemicals Company, Material Safety Data Sheet, Revised Sep. 10, 1991, Statex®.

The C.P. Hall Company, Material Safety Data Sheet, Revised Apr. 1995, Calcium Oxide HP.

3M, Material Safety Data Sheet, Document No. 10–4001–3, Issued Feb. 21, 1995, PPA–790, DYNAMAR Brand Polymer Processing Additive.

GE Silicones, Material Safety Data Sheet, p. SF96–1000, Revised Mar. 23, 1990, Dimethylpolysiloxanes.

DuPont Polymers, Material Safety Data Sheet, Revised, Aug. 14, 1995, HVA–2.

Hercules Incorporated, Material Safety Data Sheet, MSDS No. 445 7023 0200, Issued Nov. 23, 1994, DI–CUP® 40KE organic peroxide.

Dan Sprinklers Irrigation Equipment, Dan 2001, Flow Compensated Micro–Sprinkler.

Netafim Quality Works, Netafrim Ram Pressure Compensating Dripperline.

*Primary Examiner*—Kevin Weldon
*Attorney, Agent, or Firm*—Biebel & French

[57] ABSTRACT

Fluid flow control devices such as drip irrigation or micro-sprinkler valves and emitter unit membranes are constructed of an elastomeric composition selected from the group consisting of (1) a halogenated butyl elastomer, and (2) a diene nitrile elastomer and mixtures of (1) and (2). An ethylene propylene diene elastomer EDPM can also be incorporated into the composition. Use of the compositions inhibits valve and membrane swelling that would otherwise occur when such valves and membranes are contacted by water sources comprising organic and inorganic impurities.

63 Claims, 4 Drawing Sheets

LOW THROUGHPUT WATER SYSTEM FLOW CONTROL MEMBERS AND METHODS OF INHIBITING SWELLING OF SUCH MEMBERS

CROSS-REFERENCE TO RELATED APPLICATION

Benefit of the U.S. Provisional Application entitled "Low Throughput Water System Flow Control Members And Methods Of Inhibiting Swelling Of Such Members," Ser. No. 60/011,817 filed Feb. 16, 1996, now abandoned, is claimed.

FIELD OF THE INVENTION

The present invention pertains to an elastomeric composition that is useful in the construction of flow control members or membranes in low throughput water drip irrigation or micro sprinkler systems. Swelling of such members or membranes that normally occurs when same are contacted by impure water sources including inorganic or organic impurities is inhibited when the member or membrane is constructed of the elastomeric composition.

BACKGROUND OF THE INVENTION

Low throughput water systems such as drip irrigation and micro sprinkler systems provide pressure compensated, controlled water flow for a variety of purposes. For example, these systems provide carefully controlled water flow to a variety of plants, crops and trees. Additionally, these water systems may be used to leach wastewater and other effluents into leach fields and run-off ponds and the like.

In low throughput micro sprinkler systems, specially constructed emitter nozzles or valves and emitter membranes are provided along the flow path to regulate sprinkled water flow and distribution.

In many drip irrigation systems, irrigation conduits communicate with emitter units that are coupled to the conduit along spaced apart locations. These emitter units serve to ensure that a substantially pressure-less uniform drip emerges from the irrigation conduit to provide controlled, adequate watering to the desired plants, crops or trees.

The emitter units on both drip and micro sprinkler systems often comprise a flexible elastomeric member or membrane in the form of a thin disk or strip that overlies or is juxtaposed along an outlet or plurality of outlet apertures of the emitter valve. In alternative structures, an emitter valve itself is provided along the irrigation or fluid conduit to control flow from inside the conduit to the outside. This emitter valve can be constructed of an elastomeric polymer with lips or other spaced members thereof defining inlet and outlet passages to regulate water flow therethrough.

As an example of a drip irrigation emitter unit wherein an elastomeric strip of membrane is used to control flow, U.S. Pat. No. 4,210,287 (Mehoudar) is noted. The disclosure of this patent is hereby incorporated by reference herein. In this patent, a plurality of emitter unit structures is shown with each being provided with a "resiliently flexible" flow control member or membrane. As is stated in the disclosure, the membrane may comprise a natural or synthetic elastomeric material that is moveable toward and away from a flow restricting flowpath in the emitter unit in accordance with flow pressure variations in the irrigation conduit. The membrane serves to stabilize the output rate of the emitter unit with respect to pressure variations experienced in the irrigation conduit.

In U.S. Pat. No. 4,190,206 (Atkinson et al of common assignment herewith) an emitter valve comprising a one-piece elastomeric body is disclosed. The disclosure of this patent is also incorporated by reference herein. The valve comprises a pair of converging lips which terminate in spaced apart relationship to define a valve inlet port. Usually the emitter valve is disposed in the irrigation conduit with the inlet end of the valve disposed within the conduit. Line fluid pressure variations cause the lips to either converge at the intermediate lip location to restrict flow therethrough while allowing flow through the endwise portions, or to diverge at the intermediate lip location to permit flow therethrough. Accordingly, fluid flow is regulated with substantially uniform fluid flow permitted through the valve regardless of the line pressure fluctuations experienced.

Typically, low flow water systems such as the drip and micro-sprinkler systems referred to above provide fluid flow rates on the order of about 10–110 l/h under line pressures of about 1–4.0 bar.

Water sources or reservoirs that feed such low throughput water systems differ greatly in purity. Man made and natural water impurities vary depending on location of the water source and the surrounding environment. For example, organic impurities or toxins may include hexane, cumene, toluene etc. that may leach into aquifers and other water systems from underground wells. Other organic impurities include humic substances that are found primarily in surface waters. These are high molecular weight polyfunctional organic acids (both carboxylic and phenolic) formed from the breakdown of plant and animal materials.

Additionally, chlorine is commonly used in water treatment programs for a variety of reasons. It is a known disinfectant, may be used to remove ammonia and other nitrogenous organic compounds, and can also provide control over objectionable taste and odor. Chlorine addition also serves to reduce color and to control slime and algae growth.

Chlorine can be provided in gaseous form or in liquid form. Commonly utilized compounds include hypochlorities of calcium and sodium, chloramines provided via reaction of chlorine and ammonia, chlorine dioxide and chlorine donor complexes such as chlorinated cyanurates.

Potable, industrial and domestic wastewater streams may all include such impurities and can pose problems when used as water sources for water systems of the types noted above. For example, potable, industrial and domestic waste waters containing these organic and/or inorganic contaminants cause undesirable swelling of the elastomeric member or membrane in the emitter units or in the elastomeric emitter valves themselves. This swelling adversely affects water flow regulation and flow uniformity.

Accordingly, there is a need in the art to provide a flexible elastomeric composition that may be successfully used in the construction of flow regulating members or membranes in emitter units for drip irrigation and micro sprinkler systems or as an elastomeric emitter valve in these systems. Moreover, there is a need for a method of inhibiting swelling of the aforementioned members, membranes and valves that will be useful when such flow regulating devices are in contact with aqueous mediums including organic and/or inorganic impurities.

SUMMARY OF THE INVENTION

The above and other objects of the invention are met by an elastomeric composition comprising a member selected from the group consisting of (1) an halogenated butyl elastomer and (2) a diene nitrile elastomer and mixtures of (1) and (2). Optionally, (3) an ethylenepropylene diene elastomer may be incorporated into the composition. These elastomeric compositions may be either compression molded or injection molded via conventional techniques to form a flow regulating flexible member or membrane for use in an emitter unit or as an elastomeric emitter valve itself. Preliminary data have shown that strip materials made from such compositions inhibit swelling when tested in an aqueous medium comprising a test inorganic contaminant, and a test organic contaminant medium.

The invention will be further described in conjunction with the appended drawings and the following detailed description.

IN THE DRAWINGS

DETAILED DESCRIPTION OF THE INVENTION

Figure 1:
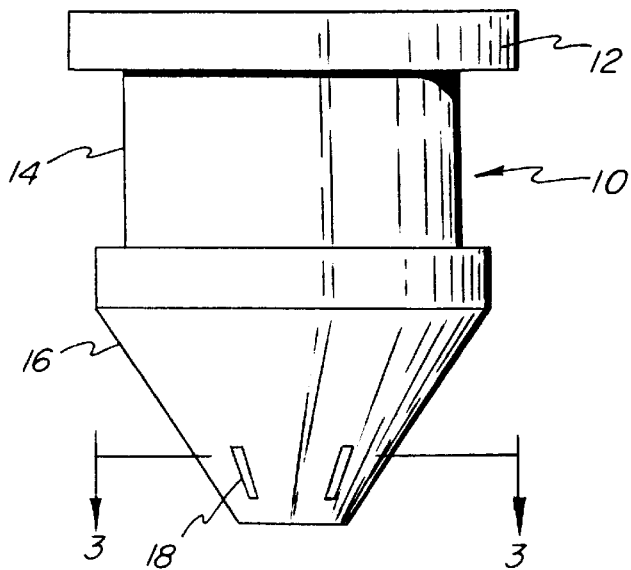
FIG. 1 is a side elevation view of an emitter unit in which an elastomeric membrane of the invention may be employed to regulate fluid flow through the unit.
Figure 2:
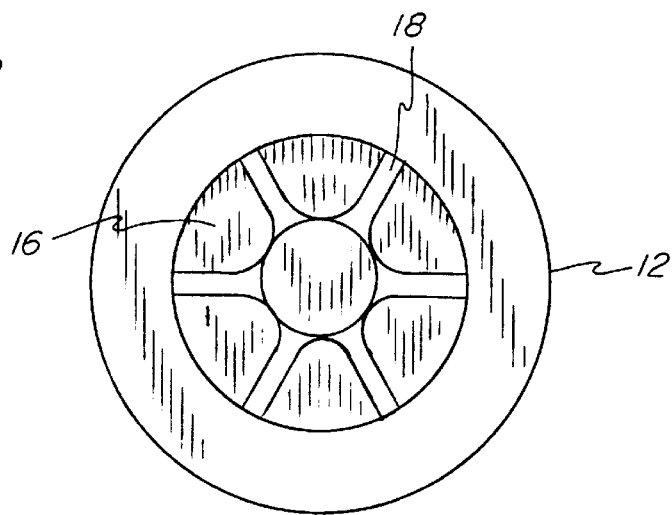
FIG. 2 is a top plan view of the emitter unit without a flexible membrane placed therein.

Turning now to FIGS. 1 and 2 of the drawings, there is shown an emitter unit 10 of the type commonly employed in drip irrigation systems. Unit 10 is adapted for reception in a irrigation conduit (not shown) with annular flange 12 of the unit provided for snug reception within an opening of the irrigation conduit. The emitter unit includes a reduced diameter section 14 leading to a truncated conically shaped drip head 16 having a plurality of drip apertures 18 therein. Water flowing through the irrigation conduit enters through the inlet opening located intermediate the annular flange 12 and exits in drip like fashion through drip apertures 18.

Figure 3:
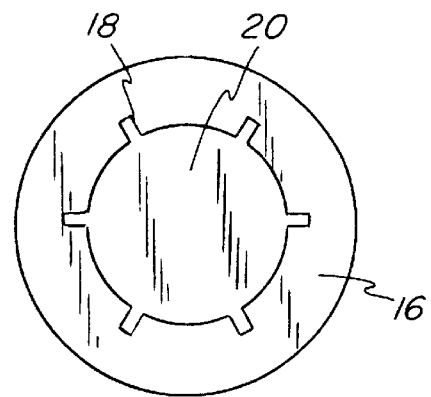
FIG. 3 is a sectional view taken along the lines and arrows 3–3 of FIG. 1 showing a flow controlling flexible membrane in place in the emitter unit.

As shown in FIG. 3, a thin, flexible elastomeric membrane 20 is disposed inside the drip head 16 and, as shown, partially covers apertures 18. Membrane 20 serves to help regulate flow through the apertures regardless of the line pressure variations that may exist along the irrigation conduit. In accordance with the invention, membrane 20 is composed of an elastomeric composition as shall be referred to in detail infra. Swelling tendencies of the membrane 20 as it is exposed to organic and inorganic impurities such as those noted above are inhibited due to employment of the elastomeric composition.

Figure 4:
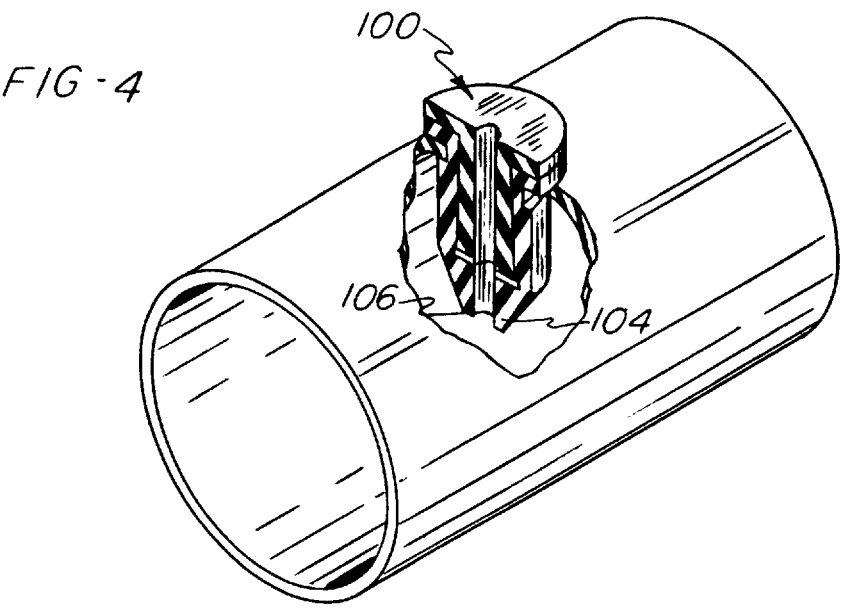
FIG. 4 is a partially cut-away perspective view of an emitter valve of the invention in combination with a drip irrigation conduit.

FIG. 4 depicts another elastomeric flow regulation device in the form of valve member 100 disposed within a suitable opening in irrigation conduit 102. The valve comprises a pair of spaced lip members 104, 106 that expand and contract in response to line pressure variations to accordingly control fluid flow therethrough. Details of this valve structure and its operation are disclosed in U.S. Pat. No. 4,190,206. Suffice it here to say that the valve 100 may be composed of the elastomeric composition of the present invention so as to inhibit swelling and other deleterious effects that occur after prolonged contact of the valve with impure water systems.

Figure 5:
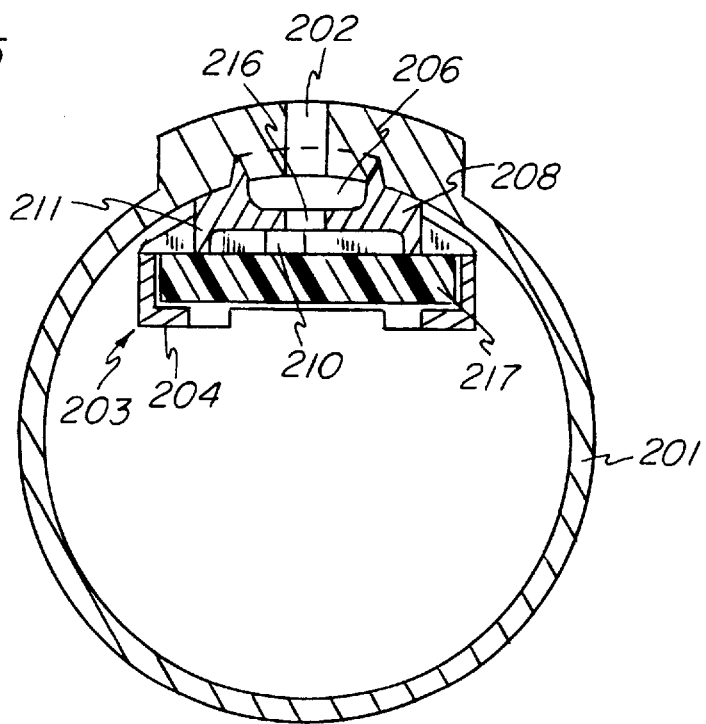
FIG. 5 is a transverse cross-sectional view of another emitter unit employing an elastomeric membrane in accordance with the invention.

FIG. 5 shows another emitter unit structure wherein a flexible membrane composed of the elastomeric composition in accordance with the invention may be used. This emitter unit and its associated structure are disclosed in U.S. Pat. No. 4,210,287. Here, the membrane 217 is in the form of a thin elongated rectangular strip disposed in the emitter unit 203 which is heat sealed to the irrigation conduit 201. The thickness of the strip is from about 1–10 mms. with 5 mms. being conventional. The emitter unit 203 comprises a body having shoulder portions 208 and downwardly extending walls 211. The membrane 217 is supported by base 204. Well 206 communicate with inlet conduit 210 through channel 216. The membrane again serves to promote uniform dripping of water flowing through the inlet 210 and weal 206 to the outside environment through aperture 202 formed in the wall of the irrigation conduit.

The flow regulating members in accordance with the invention may be molded to form the desired shapes, such as the valves shown in FIG. 4, and the thin membranes shown in FIGS. 2 and 4, through a variety of conventional molding techniques including compression and injection molding. For example, when relatively thin planar membranes are to be formed, they may be compression molded at temperatures of for example 150°–250° C., preferably 200° C., under pressures of from about 750 psi–1250 psi, preferably 1000 psi. Elongated strips of the elastomeric composition are provided as a result of this compression molding process, with the strips then being cut into the desired shapes such as disks or elongated rectangles for ultimate use in combination with emitter units of the type discussed above.

The elastomer composition comprises (1) a halogenated butyl elastomer and/or (2) a diene nitrile elastomer. optionally, a (3) ethylene propylene diene elastomer may be incorporated in the composition. Traditional curing systems and elastomer recipe fillers are added to enhance processability.

Turning first to the halogenated butyl elastomers that may be employed, these are sometimes referred to as halogenated butyl rubbers and are well known in the art and are commercially available. The halogenated butyl rubbers are prepared by halogenating butyl rubber precursors.

Butyl rubber is a low unsaturation rubber copolymer containing from about 85–99.5% of a $C_4$–$C_7$ isoolefin such as isobutylene, 2-methyl-1-butene or 3methyl-1-butene and about 0.5–15% of a $C_4$—$C_{14}$ multiolefin such as myrcene (7-methyl-3-methylene-1,6,-octadiene), cyclopentadiene, or preferably isoprene. Unmodified, uncured butyl rubber is halogenated until it contains greater than about 0.5 wt % of combined halogen. Generally, there should be at least about 1.0 wt % of combined halogen in the polymer but not more than one atom of Cl or two or three Br atoms combined in the polymer per double bond present in the polymer. A variety of conventional halogenating agents, reaction schemes and conditions may be employed to effect halogenation. These may be discerned for example by review of columns 2 and 3 of U.S. Pat. No. 3,028,346, herein incorporated by reference.

Preferred halogenated butyl elastomers include chlorinated poly (isobutylene/isoprene) rubber (i.e. chlorobutyl rubber) and brominated butyl rubber. At present chlorobutyl rubber available from Exxon is preferred as the (1) halogenated butyl elastomer component of the composition.

The diene nitrile elastomer, component (2) comprises the hydrogenated nitrile rubbers that are based on butadiene/acrylonitrile copolymers containing from about 5–60 wt % and preferably 10–50 wt % by weight copolymerized acrylonitrile. In accordance with conventional terminology, "hydrogenated nitrile rubbers" encompass nitrile rubbers where the C—C bonds of the butadiene moiety are selectively hydrogenated (i.e., without hydrogenation of the nitrile groups from acrylonitrile). Hydrogenated nitrile rubbers typically are those having a degree of hydrogenation, based on the C—C double bonds (from butadiene) of at least about 80%, preferably at least 95%. The hydrogenated nitrile rubber component (2) presently preferred for use is available from Zeon Chemicals, Inc. under the Zetpol 2020 trademark.

In addition to the elastomers (1) and (2), an ethylene-propylene diene (EPDM) elastomer is optionally included. As is known in the art, a plurality of diene monomers may be selected for these elastomers including those selected from ethylidene norbornene, dicyclopentadiene, and 1,4 hexadiene. At present, it is preferred to use ethylene-propylene dicyclopentadiene on a silicon dioxide carrier as the EPDM. This is available from Natrochem Inc. under the Trilene 65 DLC-A designation.

The elastomeric composition of the present invention comprises a member selected from the group consisting of elastomers (1) and (2) and mixtures thereof. Additionally, another elastomer (3) is preferably added to the grouping (1) and (2). Exemplary compositions include the following:

Elastomer (1) and (3) present in an amount by weight of about 80–99.9% (1) and about 20–0.1% (3); preferred about 90% (1) and about 10% (3).

(B) Elastomer (1) and (2) present in an amount by weight of about 99–1 wt % (1) and about 1–99 wt % (2). Most preferred are the elastomeric compositions including about 70–30% (1) and 30–70% (2).

Blends of elastomers (1) (2) and (3) are preferred in contrast to the above noted single and dual elastomer compositions. In these cases, a minor amount of (3) may be present on the order of about 5–30 wt % based upon the combined weight of (1) (2) and (3). The elastomer (3) is added as a process aid to help provide a smooth surface to the composition. The amounts of (1) and (2) should be between 95–5 wt % (1) and 5–95 wt % (2) based upon the combined weight of (1) (2) and (3) and, of course with the stipulation that the amounts of (1) (2) and (3) add up to 100 wt %. One elastomer blend composition presently preferred for use comprises the elastomers (1) (2) and (3) in the amounts of about 35 wt % (1) about 55 wt % (2) and about 10 wt % (3). Another preferred composition comprises about 55 wt % (1), about 35 wt % (2) and about 10 wt % (3).

The elastomeric components are prepared in combination with a curing system component or components. These curing system components are conventional in the art and may comprise for example well-known peroxide curing components and amine curing components, preferably tertiary amine curing components.

The elastomeric component(s) and the curing system components may be admixed with other elastomeric compounding ingredients such as fillers, reinforcing agents, pigments, plasticizers and extenders, antioxidants, stabilizers, tackifiers, flame retardants, fungicides and others. All of these are known to the skilled artisan.

The elastomer(s), curing components and compounding ingredients may be mixed in a Banbury, extruder, two-roll mill or Henschel mixer or other mixing device. Standard mixing procedures and techniques are to be employed with the only requirement being that a uniform mixing of the elastomers, curing components and compounding ingredients should be achieved. The compositions are then molded into the desired form as an emitter valve or thin, flexible membrane as stated above.

| | phr |
|---|---|
| IIR35 Elastomer Composition | |
| elastomer (1) chlorobutyl rubber Exxon 5066 | 35 |
| elastomer (2) hydrogenated butadiene/acrylonitrile elastomer - Zetpol 0020 | 55 |
| elastomer (3) Trilene 65 DLC EPDM | 10 |
| Curing Agents | |
| Dicumyl peroxide and silane modified clay - available - Hercules; | 20 |
| N,N'-m-phenylene dimaleimide - available DuPont | 10 |
| Other Ingredients | |
| Carbon black | 5 |
| Calcium oxide | 5 |
| Mix of fluorinated $C_4$—$C_8$ alcohols and calcium carbonate- PPA - 790 Dynamar, 3M | 1 |
| Silicone fluid GE silicones | 3 |

In another preferred composition (II R 55) the elastomer (1) is present in an amount of about 55 pph and (2) is present in an amount of 35 pph with (3) present in an amount of 10 pph. The curing agent and other ingredients are the same as in IIR35.

EXAMPLES

In order to demonstrate the efficiency of the elastomeric compositions of the invention in inhibiting swelling of membranes composed thereof, a plurality of different compositions in accordance with the invention were compression molded and then cut into thin strips. Percentage volume changes of these stripes were measured and contrasted to the performance of strips composed of prior art 100% EPDM elastomer upon immersion in a variety of contaminants.

Example 1 Hexane Swelling Inhibition

Figure 6:
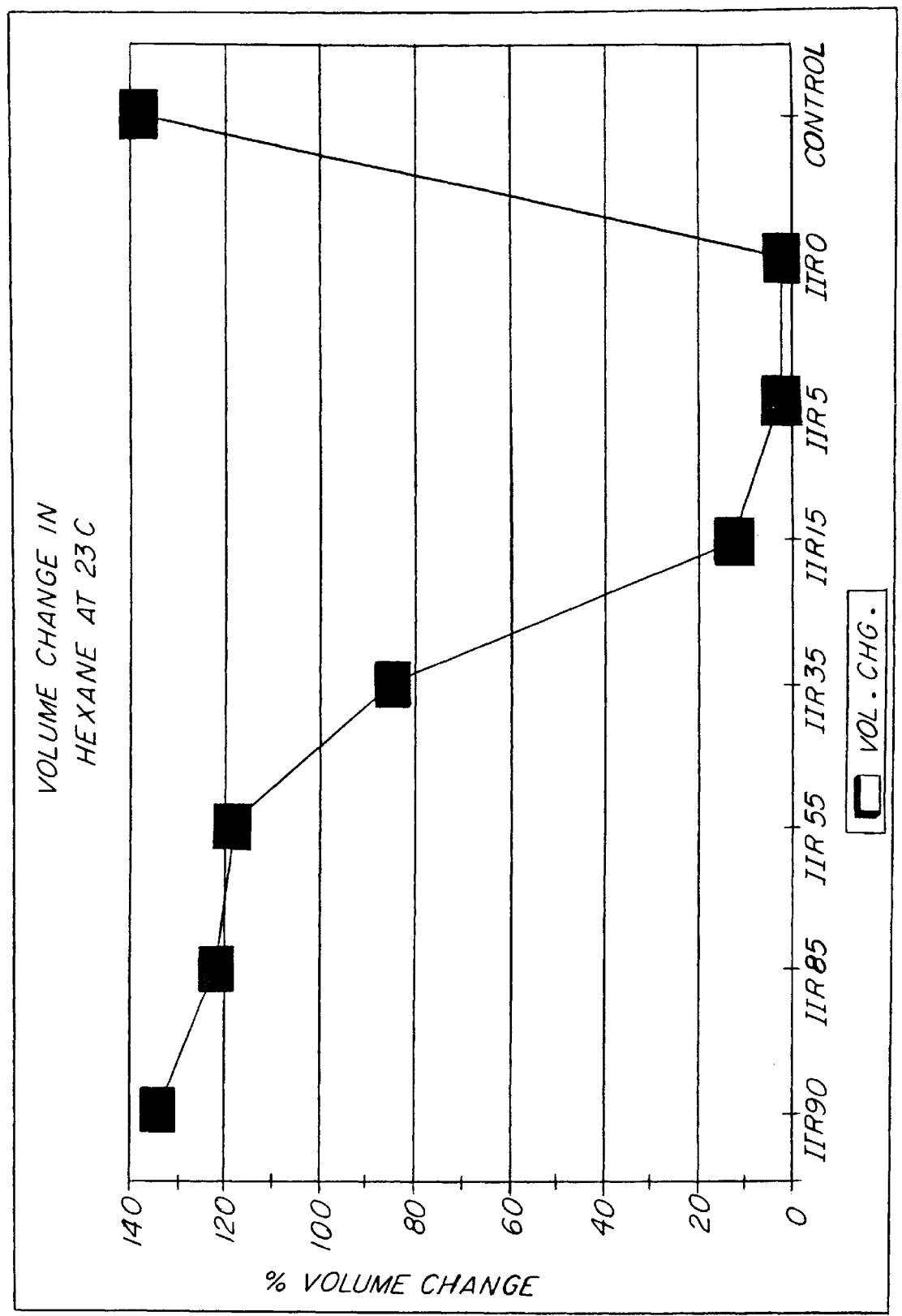
FIG. 6 is a graph showing the reduction of volume change of membranes in accordance with the invention compared to the control tested in a hexane solution.

In this test, the sample strips were immersed in a 100% hexane solution for a period of 24 hours. Temperature was maintained at 230° C. Volume measurements for each strip were taken prior to and after immersion. Results of these tests are shown graphically in FIG. 6 in terms of % volume change for each of the sample strips tested.

The elastomeric blends tested were identified as follows:

| | |
|---|---|
| IIR 90 | 90 pph chlorinated isobutylene/isoprene copolymer (CIIR) 10 pph EPDM |
| II R 85 | 85 pph (CIIR) 15 pph hydrogenated butadiene/acrylonitrile elastomer (HBA) |
| II R 55 | 55 pph CIIR |

-continued

|          |              |
|----------|--------------|
|          | 35 pph HBA   |
|          | 10 pph EPDM  |
| II R 35  | 55 pph HBA   |
|          | 35 pph CIIR  |
|          | 10 pph EPDM  |
| II R 15  | 75 pph HBA   |
|          | 15 pph CIIR  |
|          | 10 pph EPDM  |
| II R 5   | 85 pph HBA   |
|          | 5 pph CIIR   |
|          | 10 pph EPDM  |
| II R 0   | 90 pph HBA   |
|          | 10 pph EPDM  |
| CONTROL  | 100 pph EPDM |

CIIR = "chlorobutyl rubber" Exxon Chemical
HBA = "Zetpol" - Zeon Chemicals Inc., Rolling Meadows, Illinois
EPDM = "Trilene 65 DLC-A" - Natrochem Inc., - ethylene-propylene dicyclopentadiene on $SiO_2$.

Example 2 Chlorine Swelling Inhibition

Figure 7:
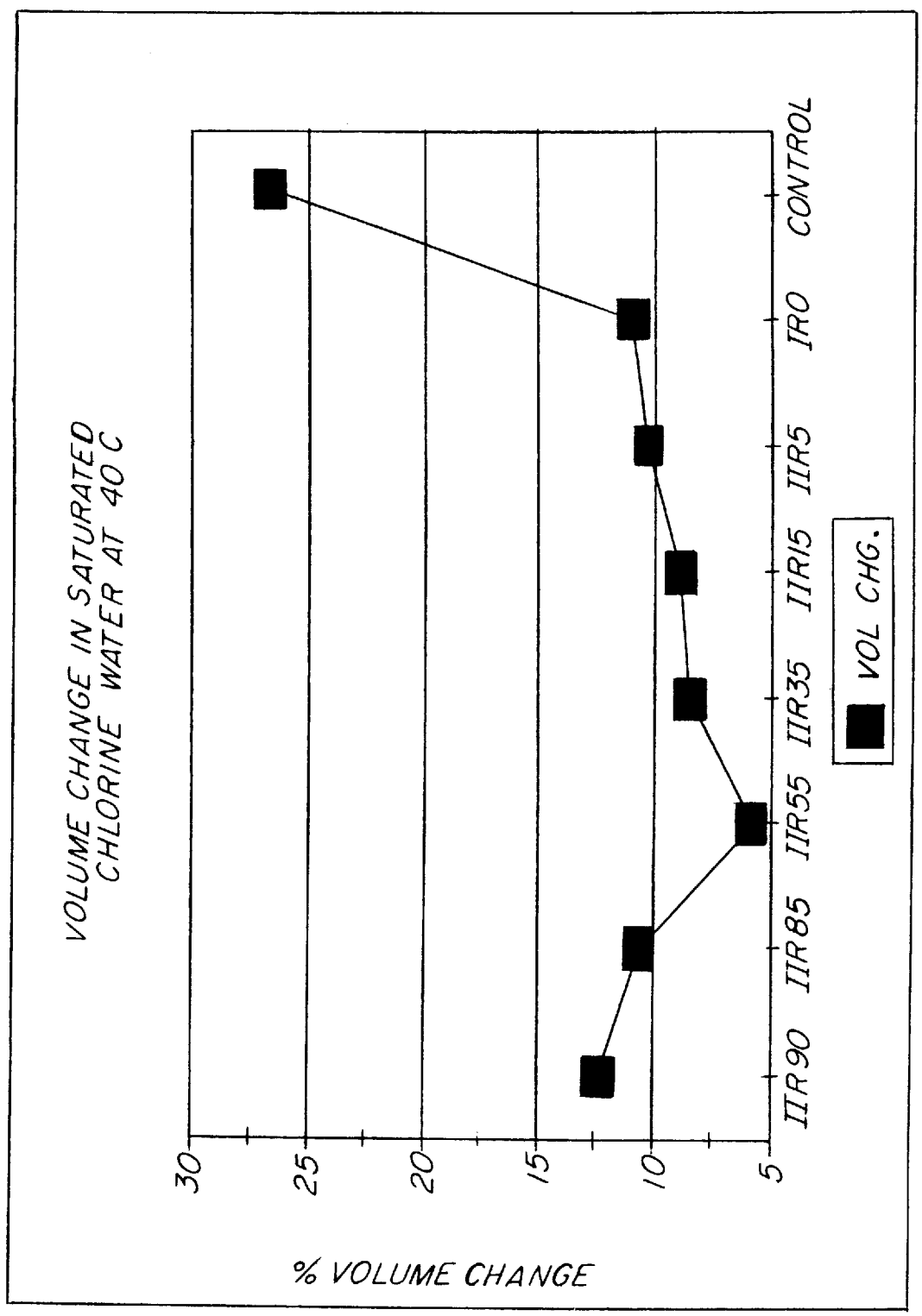
FIG. 7 is a graph showing the reduction of volume change of membranes in accordance with the invention compared to the control tested in a chlorine containing aqueous solution.

Here, the sample strips were prepared as stated above in Example 1 and immersed in an aqueous solution comprising 3000 ppm Cl—for 24 hours at 40° C. Results of the strip volume measurements are shown in FIG. 7. Identification of the elastomeric blends tested is the same as given in conjunction with Example 1.

Discussion of Examples

Turning first to Example 2, it can be seen that all of the candidate elastomeric blends performed much better than the control in inhibiting membrane swelling caused by Cl—impurities in the water. Indeed all of the candidate strips resulted in a less than 15% strip volume change under the test conditions above noted, in contrast to the performance of the control strip. In the hexane immersion tests of Example 1, samples HNBR 75, HNBR 85 and HNBR 90 especially performed much better than the control.

Based upon these experimental data, samples IIR55, IIR35, IIR15, IIR5, and IIR0 are presently preferred for use. In those cases in which the primary concern is chlorine impurities, sample IIR55 is the most preferred.

The elastomeric compositions of the invention are therefore effective in inhibiting swelling of flow regulating components and parts in contact with contaminated water systems. Employment of these compositions as emitter valves or as the flow controlling membrane in emitter units and the like in contact with such water systems will result in more uniform water flow control.

While I have shown and described herein certain embodiments of the present invention, it is intended that there be covered as well any change or modification therein which may be made without departing from the spirit and scope of the invention as defined in the appended claims.

What is claimed is:

1. In a drip irrigation system or micro sprinkler system having a fluid flow conduit, an emitter unit connected to said conduit having an inlet and outlet respectively for permitting fluid flow into and out of said emitter unit, the improvement comprising an elastomeric membrane operatively associated with said emitter unit for controlling fluid flow therethrough, said elastomeric membrane comprising an elastomer selected from the group consisting of (1) halogenated butyl elastomers and (2) diene nitrile elastomers, and mixtures of (1) and (2).

2. Membrane as recited in claim 1 wherein said halogenated butyl elastomer comprises chlorinated butyl rubber.

3. Membrane as recited in claim 2 wherein said chlorinated butyl rubber comprises a chlorinated isobutylene/isoprene copolymer.

4. Membrane as recited in claim 1 wherein said diene nitrile elastomer comprises a butadiene/acrylonitrile copolymer.

5. Membrane as recited in claim 4 wherein said butadiene/acrylonitrile copolymer is hydrogenated.

6. Membrane as recited in claim 1 further comprising (3) an ethylene-propylene diene elastomer.

7. Membrane as recited in claim 6 wherein (1) is present in an amount of about 95–5 wt %, (2) is present in an amount of about 5–95 wt % and (3) is present in an amount of about 5–30 wt %, based upon the combined weight of (1) (2) and (3) with the proviso that the combined weights of (1) (2) and (3) equal 100 wt %.

8. Membrane as recited in claim 7 wherein (1) is present in an amount of about 55 wt %, (2) is present in an amount of about 35 wt % and (3) is present in an amount of about 10 wt %.

9. Membrane as recited in claim 7 wherein (1) is present in an amount of about 35 wt %, (2) is present in an amount of about 55 wt %, and (3) is present in an amount of about 10 wt %.

10. Membrane as recited in claim 7 wherein (1) is present in an amount of about 15 wt %, (2) is present in an amount of about 75 wt % and (3) is present in an amount of about 10 wt %.

11. Membrane as recited in claim 7 wherein (1) is present in an amount of about 5 wt %, (2) is present in an amount of about 85 wt % and (3) is present in an amount of about 10 wt %.

12. Membrane as recited in claim 6 wherein (1) is present in an amount of about 90 wt % and (3) is present in an amount of about 10 wt %.

13. Membrane as recited in claim 6 wherein (2) is present in an amount of about 90 wt % and (3) is present in an amount of about 10 wt %.

14. Membrane as recited in claim 1 wherein (1) is present in an amount of about 85 wt % and (2) is present in an amount of about 15 wt %.

15. In a drip irrigation or micro-sprinkler system of the type having a fluid flow conduit and an emitter valve in communication with said conduit for controlling fluid flow from said conduit to the outside environment, the improvement wherein said emitter valve comprises an elastomer selected from the group consisting of (1) halogenated butyl elastomers and (2) diene nitrile elastomers, and mixtures of (1) and (2).

16. Emitter valve as recited in claim 15 wherein said halogenated butyl elastomer comprises chlorinated butyl rubber.

17. Emitter valve as recited in claim 16 wherein said chlorinated butyl rubber comprises a chlorinated isobutylene/isoprene copolymer.

18. Emitter valve as recited in claim 15 wherein said diene nitrile elastomer comprises a butadiene/acrylonitrile copolymer.

19. Emitter valve as recited in claim 18 wherein said butadiene/acrylonitrile copolymer is hydrogenated.

20. Emitter valve as recited in claim 15 further comprising (3) an ethylene-propylene diene elastomer.

21. Emitter valve as recited in claim 20 wherein (1) is present in an amount of about 95–5 wt %, (2) is present in an amount of about 5–95 wt % and (3) is present in an amount of about 5–30 wt %, based upon the combined weight of (1) (2) and (3) with the proviso that the combined weights of (1) (2) and (3) equal 100 wt %.

22. Valve as recited in claim 21 wherein (1) is present in an amount of about 55 wt %, (2) is present in an amount of about 35 wt % and (3) is present in an amount of about 10 wt %.

23. Valve as recited in claim 21 wherein (1) is present in an amount of about 35 wt %, (2) is present in an amount of about 55 wt %, and (3) is present in an amount of about 10 wt %.

24. Valve as recited in claim 21 wherein (1) is present in an amount of about 15 wt %, (2) is present in an amount of about 75 wt % and (3) is present in an amount of about 10 wt %.

25. Valve as recited in claim 21 wherein (1) is present in an amount of about 5 wt %, (2) is present in an amount of about 85 wt % and (3) is present in an amount of about 10 wt %.

26. Valve as recited in claim 20 wherein (1) is present in an amount of about 90 wt % and (3) is present in an amount of about 10 wt %.

27. Valve as recited in claim 20 wherein (2) is present in an amount of about 90 wt % and (3) is present in an amount of about 10 wt %.

28. Valve as recited in claim 15 wherein (1) is present in an amount of about 85 wt % and (2) is present in an amount of about 15 wt %.

29. In a drip irrigation or micro-sprinkler system of the type having a fluid flow conduit, an emitter unit in communication with said conduit for permitting fluid flow from said conduit to the outside atmosphere and an elastomeric flow control membrane in operative association with said emitter unit for controlling the flow of fluid through said emitter unit to said outside atmosphere, a method of inhibiting swelling of said membrane caused by the presence of impurities in said fluid, said method comprising contacting said membrane with a said fluid, providing said membrane with a swelling inhibiting elastomeric composition comprising an elastomer selected from the group consisting of (1) halogenated butyl elastomers and (2) diene nitrile elastomers, and mixtures of (1) and (2).

30. Method as recited in claim 29 wherein said impurities comprise an impurity selected from the group consisting of chlorine and hexane.

31. Method as recited in claim 29 wherein said fluid comprises potable water.

32. Method as recited in claim 29 wherein said fluid comprises industrial waste water.

33. Method as recited in claim 29 wherein said halogenated butyl elastomer comprises chlorinated butyl rubber.

34. Method as recited in claim 33 wherein said chlorinated butyl rubber comprises a chlorinated isobutylene/isoprene copolymer.

35. Method as recited in claim 29 wherein said diene nitrile elastomer comprises a butadiene/acrylonitrile copolymer.

36. Method as recited in claim 35 wherein said butadiene/acrylonitrile copolymer is hydrogenated.

37. Method as recited in claim 29 wherein said elastomeric composition further comprises (3) an ethylene-propylene diene elastomer.

38. Method as recited in claim 37 wherein (1) is present in an amount of about 95–5 wt %, (2) is present in an amount of about 5–95 wt % and (3) is present in an amount of about 5–30 wt %, based upon the weight of (1) (2) and (3) with the proviso that the combined weights of (1) (2) and (3) equal 100 wt %.

39. Membrane as recited in claim 38 wherein (1) is present in an amount of about 55 wt %, (2) is present in an amount of about 35 wt % and (3) is present in an amount of about 10 wt %.

40. Method as recited in claim 38 wherein (1) is present in an amount of about 35 wt %, (2) is present in an amount of about 55 wt %, and (3) is present in an amount of about 10 wt %.

41. Method as recited in claim 38 wherein (1) is present in an amount of about 15 wt %, (2) is present in an amount of about 75 wt % and (3) is present in an amount of about 10 wt %.

42. Membrane as recited in claim 38 wherein (1) is present in an amount of about 5 wt %, (2) is present in an amount of about 85 wt % and (3) is present in an amount of about 10 wt %.

43. Method as recited in claim 37 wherein (1) is present in an amount of about 90 wt % and (3) is present in an amount of about 10 wt %.

44. Method as recited in claim 37 wherein (2) is present in an amount of about 90 wt % and (3) is present in an amount of about 10 wt %.

45. Method as recited in claim 29 wherein (1) is present in an amount of about 85 wt % and (2) is present in an amount of about 15 wt %.

46. Method of inhibiting swelling of an elastomeric flow control member comprising contacting said elastomeric flow control member with a fluid comprising an inorganic or organic impurity that would in the absence of treatment cause swelling of said member, treating said member to inhibit said swelling by providing said member with an elastomeric composition comprising an elastomer selected from the group consisting of (1) halogenated butyl elastomers and (2) diene nitrile elastomers, and mixtures of (1) and (2).

47. Method as recited in claim 46 wherein said inorganic impurity comprises a chlorine impurity.

48. Method as recited in claim 46 wherein said organic impurity comprises hexane.

49. Method as recited in claim 46 wherein said fluid comprises potable water.

50. Method as recited in claim 46 wherein said fluid comprises industrial waste water.

51. Method as recited in claim 46 wherein said halogenated butyl elastomer comprises chlorinated butyl rubber.

52. Method as recited in claim 51 wherein said chlorinated butyl rubber comprises a chlorinated isobutylene/isoprene copolymer.

53. Method as recited in claim 46 wherein said diene nitrile elastomer comprises a butadiene/acrylonitrile copolymer.

54. Method as recited in claim 53 wherein said butadiene/acrylonitrile copolymer is hydrogenated.

55. Method as recited in claim 46 wherein said elastomeric composition further comprises (3) an ethylene-propylene diene elastomer.

56. Method as recited in claim 55 wherein (1) is present in an amount of about 95–5 wt %, (2) is present in an amount of about 5–95 wt % and (3) is present in an amount of about 5–30 wt %, based upon the weight of (1) (2) and (3) with the proviso that the combined weights of (1) (2) and (3) equal 100 wt %.

57. Method as recited in claim 56 wherein (1) is present in an amount of about 55 wt %, (2) is present in an amount of about 35 wt % and (3) is present in an amount of about 10 wt %.

58. Method as recited in claim 56 wherein (1) is present in an amount of about 35 wt %, (2) is present in an amount of about 55 wt %, and (3) is present in amount of about 10 wt %.

59. Method as recited in claim 56 wherein (1) is present in an amount of about 15 wt %, (2) is present in an amount of about 75 wt % and (3) is present in an amount of about 10 wt %.

60. Method as recited in claim 56 wherein (1) is present in an amount of about 5 wt %, (2) is present in an amount of about 85 wt % and (3) is present in an amount of about 10 wt %.

61. Method as recited in claim 55 wherein (1) is present in an amount of about 90 wt % and (3) is present in an amount of about 10 wt %.

62. Method as recited in claim 55 wherein (2) is present in an amount of about 90 wt % and (3) is present in an amount of about 10 wt %.

63. Method as recited in claim 46 wherein (1) is present in an amount of about 85 wt % and (2) is present in an amount of about 15 wt %

\* \* \* \* \*